(12) United States Patent
Minagawa

(10) Patent No.: US 6,770,900 B2
(45) Date of Patent: Aug. 3, 2004

(54) MECHANICAL FOR DISCHARGING SHEET-LIKE MEMBER CONTAINER

(75) Inventor: Tatsuya Minagawa, Hiratsuka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 435 days.

(21) Appl. No.: 09/988,363

(22) Filed: Nov. 19, 2001

(65) Prior Publication Data

US 2002/0063375 A1 May 30, 2002

(30) Foreign Application Priority Data

Nov. 24, 2000 (JP) ........................................ 2000-357520

(51) Int. Cl.[7] .............................................. G03B 42/02
(52) U.S. Cl. ....................... 250/589; 250/590; 250/584; 271/162
(58) Field of Search ................................. 250/589, 588, 250/584, 590, 581, 485.1; 271/10.1, 162

(56) References Cited

U.S. PATENT DOCUMENTS

| | | | | |
|---|---|---|---|---|
| 4,889,989 A | * | 12/1989 | Yoshimura et al. | 250/589 |
| 5,095,209 A | * | 3/1992 | Tamura | 250/589 |
| 5,265,865 A | * | 11/1993 | Agano et al. | 271/1 |
| 5,340,995 A | * | 8/1994 | Verbeke et al. | 250/581 |
| 5,736,746 A | * | 4/1998 | Furutoh | 250/589 |
| 6,300,646 B1 | * | 10/2001 | Otsuka | 250/589 |
| 6,342,708 B1 | * | 1/2002 | Iiyama et al. | 250/589 |
| 6,677,605 B2 | * | 1/2004 | Furue | 250/584 |
| 2002/0056961 A1 | * | 5/2002 | Sasaki et al. | 271/145 |

* cited by examiner

Primary Examiner—Albert Gagliardi
(74) Attorney, Agent, or Firm—Sughrue Mion, PLLC

(57) ABSTRACT

A discharge mechanism has a lid closing roller for closing a lid of a cassette and automatically delivering the cassette to a predetermined position upon rotation thereof, a motor for rotating the lid closing roller, and an electromagnetic clutch for transmitting rotational power from the motor to the lid closing roller and disconnecting the lid closing roller from the rotary actuator.

10 Claims, 5 Drawing Sheets

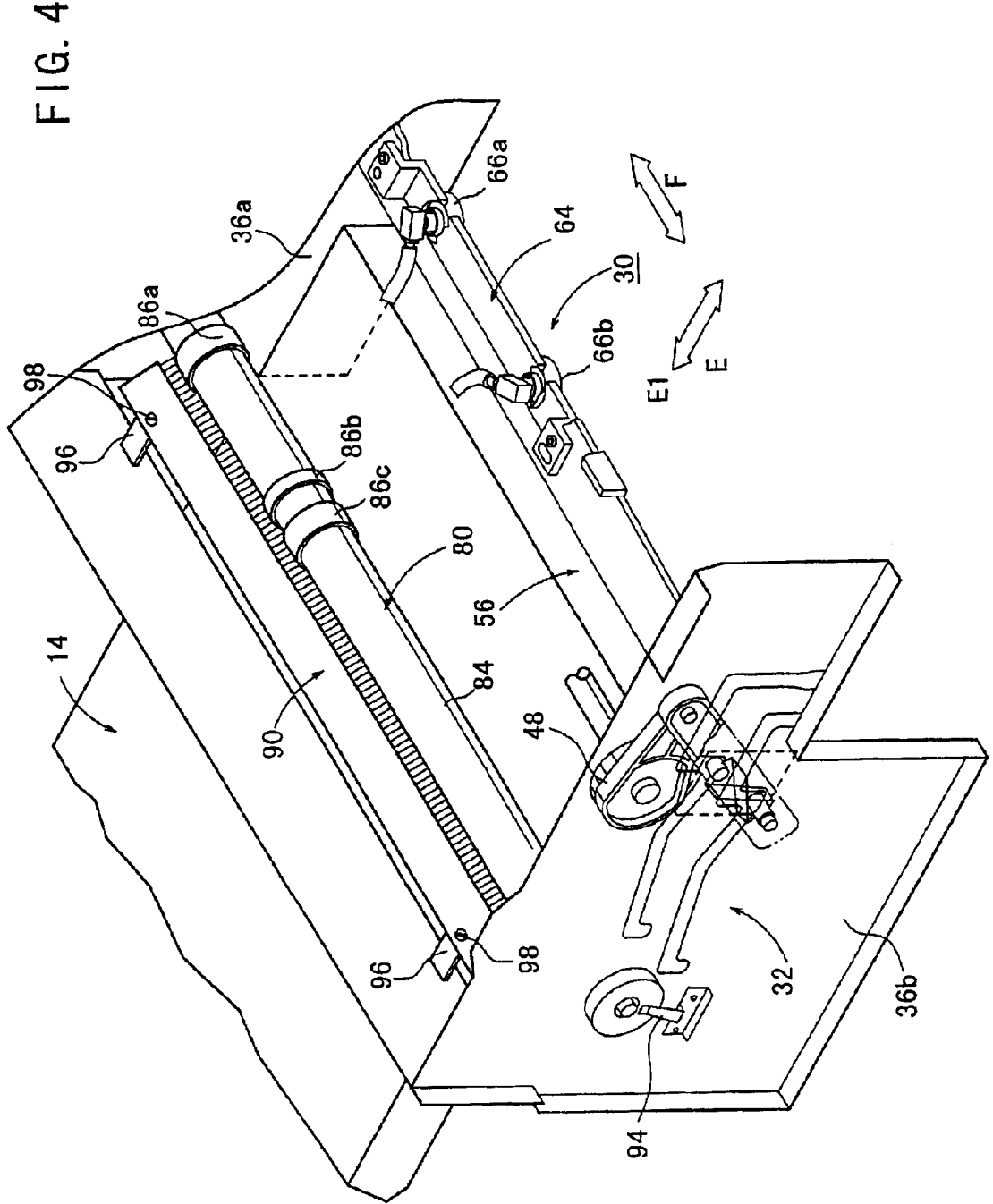

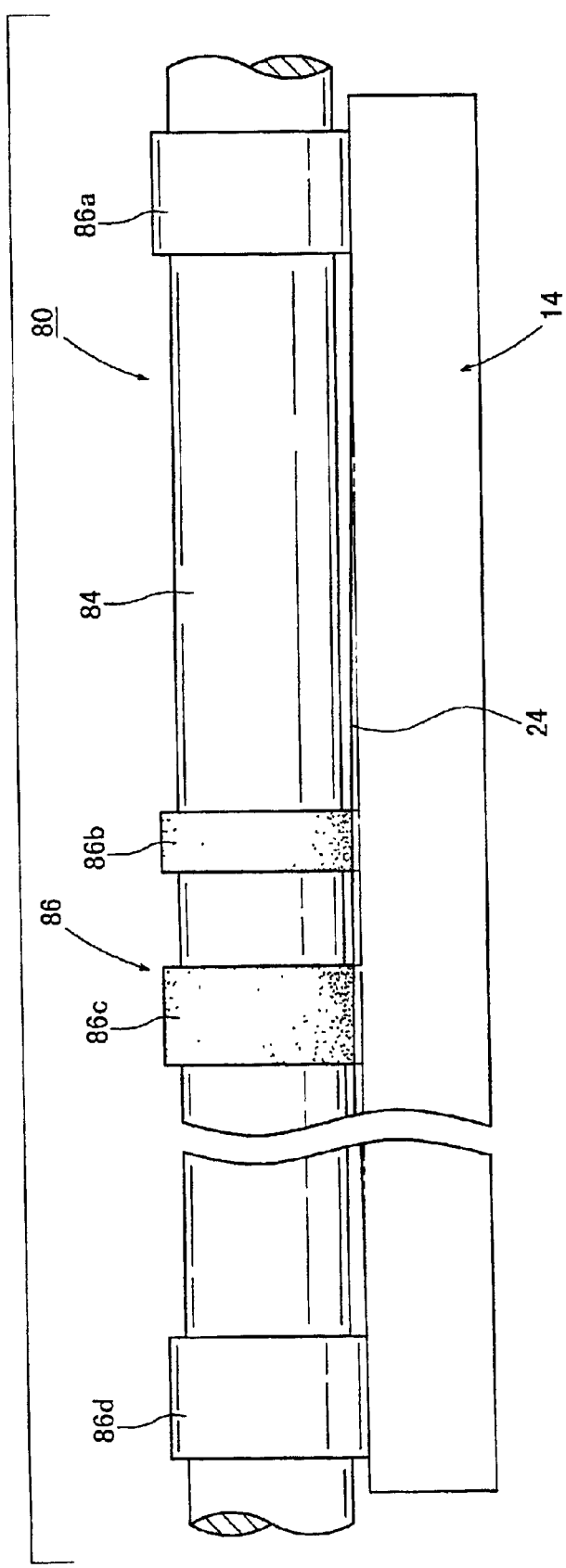

MECHANICAL FOR DISCHARGING SHEET-LIKE MEMBER CONTAINER

BACKGROUND OF THE INVENTION

1. Field of the Invention

The present invention relates to a discharge mechanism for discharging a container having a lid for opening and closing an opening through which a sheet-like member is inserted, from a containing loading unit of a sheet-like member processing apparatus.

2. Description of the Related Art

There is known a system for recording radiation image information of a subject such as a human body with a stimulable phosphor, and reproducing the recorded radiation image information on a photosensitive medium such as a photographic film, or displaying the recorded radiation image information on a display unit such as a CRT or the like.

The stimulable phosphor is a phosphor which, when exposed to an applied radiation (X-rays, α-rays, γ-rays, electron beams, ultraviolet radiation, or the like), stores a part of the energy of the radiation, and, when subsequently exposed to applied stimulating rays such as visible light, emits light in proportion to the stored energy of the radiation. Usually, a sheet provided with a layer of the stimulable phosphor is used as a stimulable phosphor sheet for easy handling.

The above known system employs a cassette-loading radiation image reading apparatus having a cassette loading unit for loading a cassette (container) which houses a stimulable phosphor sheet with radiation image information recorded thereon, an image reading unit for reading the radiation image information carried by the stimulable phosphor sheet which has been removed from the cassette, and an erasing unit for erasing residual radiation image information on the stimulable phosphor sheet.

In the cassette loading unit, when the stimulable phosphor sheet from which the desired radiation image information has been read and the residual radiation image information has been erased is returned into the cassette, the operator manually removes the cassette from the cassette loading unit. As the stimulable phosphor sheet is removed from the cassette loading unit, the lid of the cassette is closed by a lid closing mechanism which is operated upon removal of the cassette from the cassette loading unit.

However, since the removal of the cassette from the cassette loading unit is manually performed by the operator, if the cassette is forcibly pulled out quickly, the stimulable phosphor sheet may possibly be ejected partly or wholly from the cassette before the lid is closed. The stimulable phosphor sheet thus forced out may be damaged and introduced into the cassette-loading radiation image reading apparatus.

SUMMARY OF THE INVENTION

It is a major object of the present invention to provide a mechanism for discharging a sheet-like member container while reliably preventing a sheet-like member from being undesirably ejected the container regardless of an action to load or unload the sheet-like member container.

For a discharge mechanism to discharge a container from a container loading unit of a sheet-like member processing apparatus, rotational power from a rotary actuator is transmitted via clutch means to a lid closing roller. The lid closing roller is rotated to automatically deliver the container from the container loading unit to a predetermined position, and close a lid of the container which has opened an opening in the container. Then, the operator manually unloads the container from the container loading unit.

Since the container is delivered to the position where the sheet-like member does not jump out of the container upon rotation of the lid closing roller, the sheet-like member is reliably prevented from jumping out of the container even if the operator forcibly pulls the container quickly from the container loading unit. Therefore, when the operator pulls the container, the sheet-like member is prevented from jumping out of the container and hence being damaged, and is also effectively prevented from entering the sheet-like member processing apparatus.

The lid closing roller and the rotary actuator can be disconnected from each other by the clutch means. Consequently, when the operator manually unloads the container from the container loading unit or manually loads the container into the container loading unit, the rotation of the lid closing roller is not transmitted to the rotary actuator, and hence no excessive load is imposed on the operator.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 4 is a perspective view of the discharge mechanism; and

FIG. 5 is a fragmentary elevational view showing the manner in which a lid closing roller assembly of the discharge mechanism operates.

DESCRIPTION OF THE PREFERRED EMBODIMENT

Figure 1:
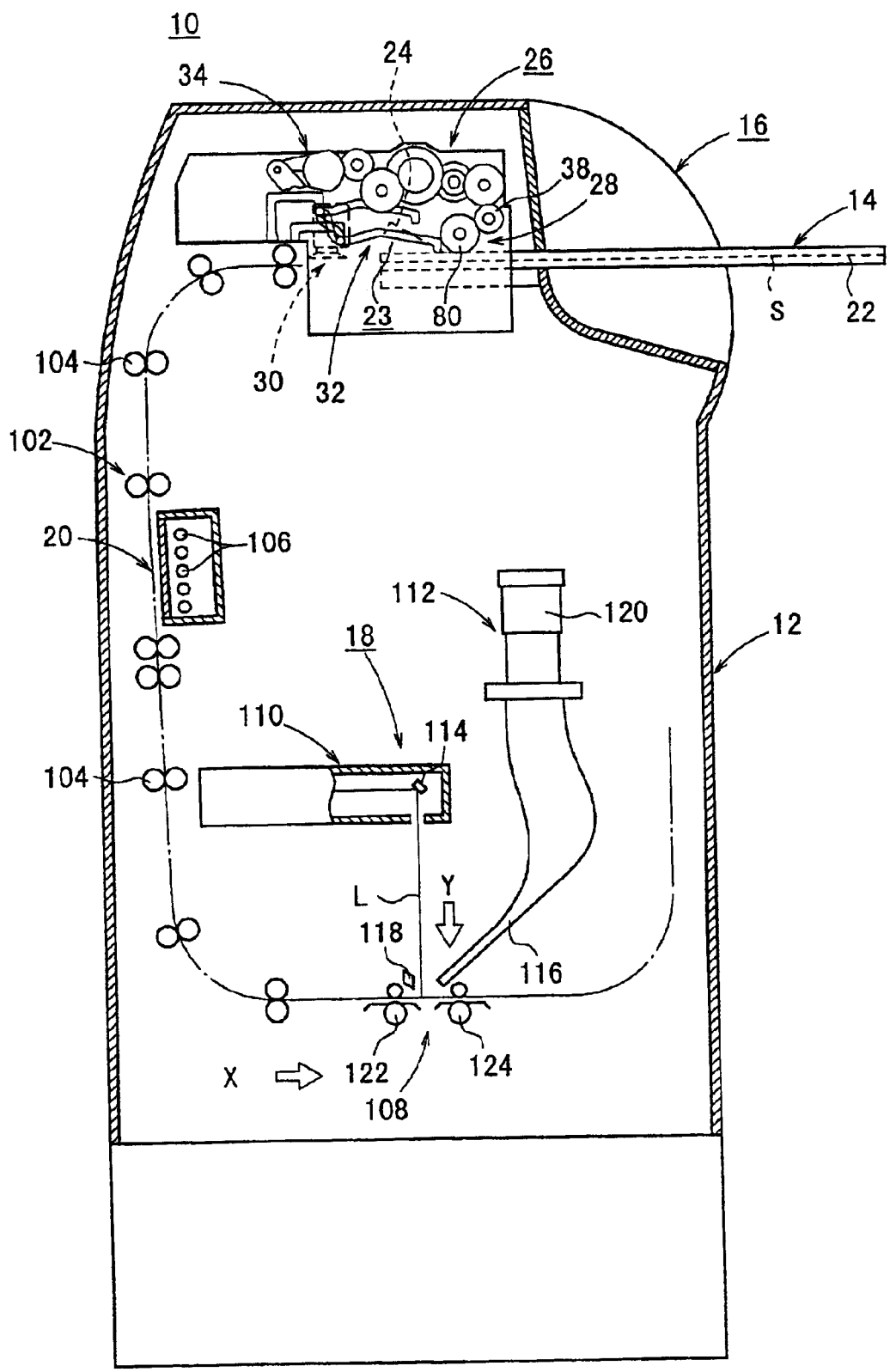
FIG. 1 is a vertical cross-sectional view of an internal structure of an image information reading apparatus incorporating a discharge mechanism according to the present invention.

FIG. 1 shows an internal structure of an image information reading apparatus 10 incorporating a discharge mechanism according to the present invention.

As shown in FIG. 1, the image information reading apparatus 10 has an apparatus housing 12 which houses therein a cassette loading unit 16 (container loading unit) for loading a cassette (container) 14 which stores therein a stimulable phosphor sheet (sheet-like member) S as on which the radiation image information of a subject or the like is temporarily recorded, a reading unit 18 for applying a laser beam L as stimulating light to the stimulable phosphor sheet S to photoelectrically read the recorded radiation image information from the stimulable phosphor sheet S, and an erasing unit 20 for erasing residual radiation image information from the stimulable phosphor sheet S after the desired recorded radiation image information has been read from the stimulable phosphor sheet S.

The cassette 14 comprises a casing 22 for housing the stimulable phosphor sheet S therein, and a lid 24 openably and closably mounted on an end of the casing 22 for opening and closing an opening 23 in the casing 22. The cassette loading unit 16, in which the cassette 14 is to be inserted horizontally, has a lid opening/closing mechanism (not shown) for opening and closing the lid 24, and a feed mechanism (sheet-like member feed mechanism) 26 for attracting and removing the stimulable phosphor sheet S from the cassette 14 and also returning the stimulable phosphor sheet S back into the cassette 14 after recorded image information has been read and residual image information has been erased. The cassette loading unit 16 incorporates a discharge mechanism 28 for discharging the cassette 14 from the image information reading apparatus 10 according to the present invention.

Figure 2:
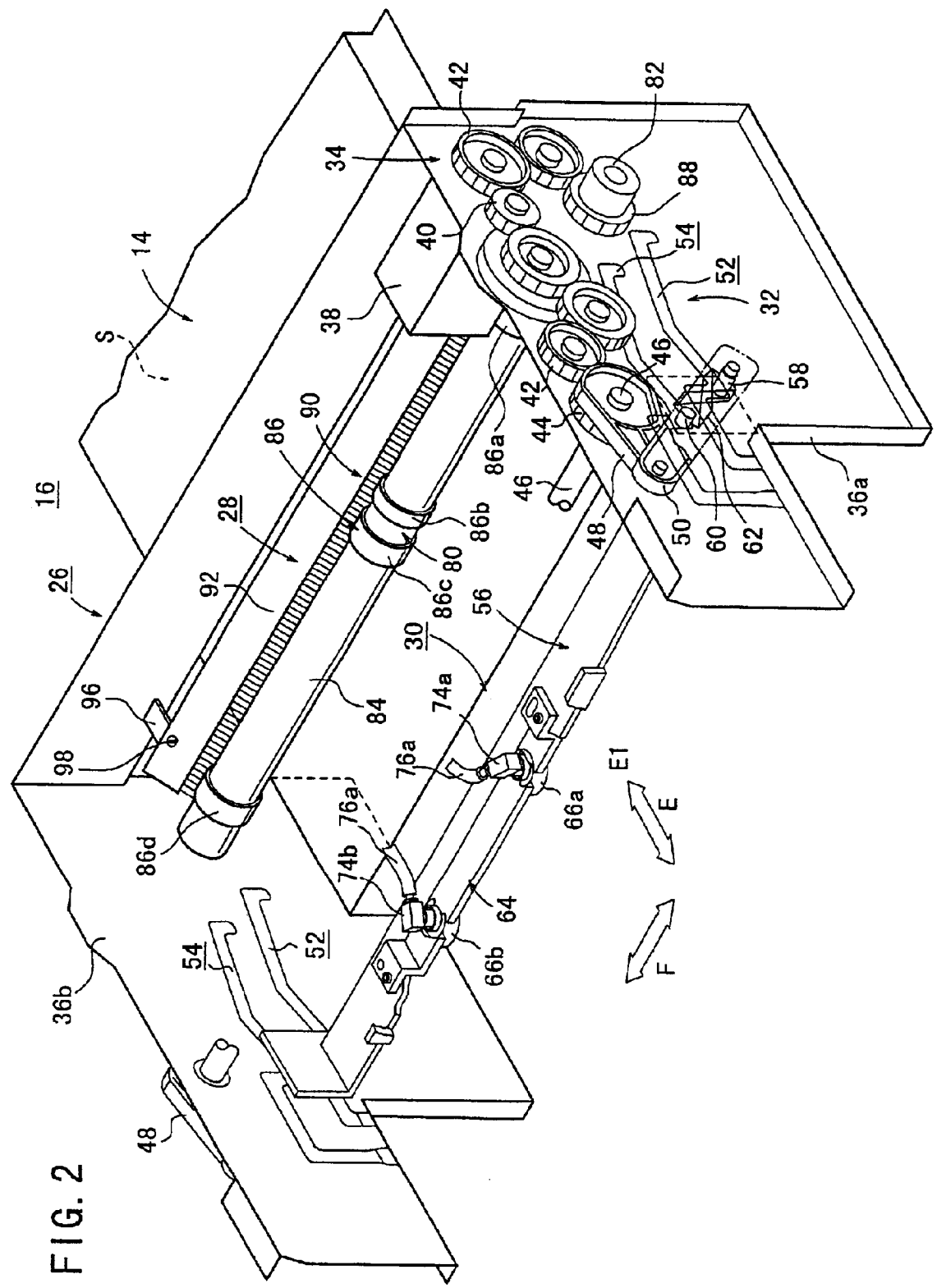
FIG. 2 is a perspective view of the discharge mechanism and a feed mechanism.
Figure 3:
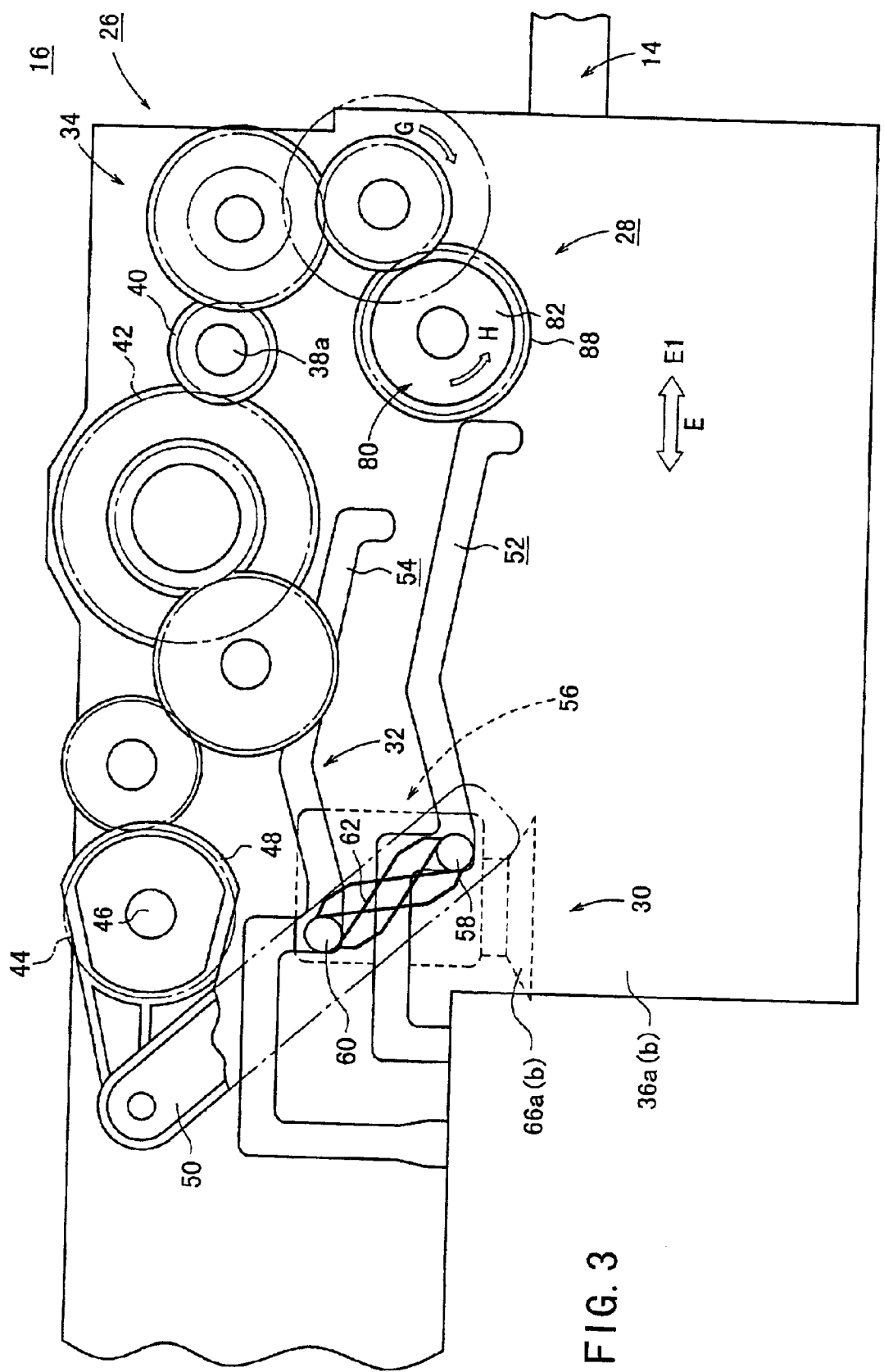
FIG. 3 is a side elevational view of the discharge mechanism and the feed mechanism.

As shown in FIGS. 2 and 3, the feed mechanism 26 has a suction mechanism 30 for attracting, under suction, the stimulable phosphor sheet S in the cassette 14 whose lid 24 has been opened in the cassette loading unit 16, a guide mechanism 32 for guiding the suction mechanism 30 along a predetermined path, and an actuator 34 for moving the suction mechanism 30 while the suction mechanism 30 is being guided by the guide mechanism 32.

The feed mechanism 26 has a pair of vertical side plates 36a, 36b spaced from each other in the direction indicated by the arrow F which extends across the direction indicated by the arrow E. The direction indicated by the arrow E is a direction of removing the stimulable phosphor sheet S from and returning the stimulable phosphor sheet S into the cassette 14. On the side plate 36a, there is fixedly mounted a motor 38 of the actuator 34 which has a drive shaft 38a supporting a drive gear 40 thereon. The drive gear 40 is held in mesh with a gear train 42 comprising a plurality of gears, which is held in mesh with a driven gear 44. The driven gear 44 is fixedly mounted on an end of a rotatable shaft 46 that extends in the direction indicated by the arrow F and has opposite ends rotatably supported on the side plates 36a, 36b. Swing arms 48 are fixedly mounted on the respective opposite ends of the rotatable shaft 46. Links 50 have respective ends swingably coupled to outer projecting ends of the swing arms 48.

Each of the side plates 36a, 36b have two guide grooves 52, 54 of the guide mechanism 32 defined therein for moving the suction mechanism 30 along a path inclined downwardly from above toward the surface to be attracted of the stimulable phosphor sheet S. The attracted surface of the stimulable phosphor sheet S is opposite to the recording surface thereof. Each of the guide grooves 52, 54 has a predetermined shape. The suction mechanism 30 includes a movable arm 56 having opposite ends, each of which supports a first support shaft 58 and a second support shaft 60 fixed thereto. The first and second support shafts 58, 60 are received in the respective guide grooves 52, 54. The first support shaft 58 projects outwardly through the guide groove 52 and engages the other end of the link 50. The first and second support shafts 58, 60 are supported on each other by a joint member 62.

An attachment 64 is detachably mounted on the movable arm 56, and suction cups 66a, 66b are mounted on the attachment 64. The suction cups 66a, 66b are detachably mounted on the movable arm 56 together with the attachment 64. Hose-connecting joints 74a, 74b are mounted on respective upper portions of the suction cups 66a, 66b.

Hoses 76a, 76b have respective ends connected to the respective joints 74a, 74b and respective opposite ends connected to a vacuum source, not shown.

The discharge mechanism 28 comprises a lid closing roller 80 for engaging the lid 24 of the cassette 14 to close the lid 24 and automatically delivering the cassette 14 to a given position, the motor 38 serving as a rotary actuator for rotating the lid closing roller 80, and an electromagnetic clutch (clutch means) 82 for transmitting rotational power from the motor 38 to the lid closing roller 80 and disconnecting the lid closing roller 80 from the rotary actuator 38.

The lid closing roller 80 extends in the direction indicated by the arrow F which extends across the direction indicated by the arrow E for removing the stimulable phosphor sheet S from and returning the stimulable phosphor sheet S into the cassette 14, and is rotatably supported by the side plates 36a, 36b. The lid closing roller 80 has a shaft 84 made of an electrically conductive material and a plurality of rubber rings 86, each having a certain width, mounted on the shaft 84 at axially spaced intervals. The rubber rings 86 serve as rollers including a reference roller 86a disposed along a reference position with which each end of differently dimensioned cassettes 14 is aligned, first rollers 86b, 86c disposed for coaction with cassettes 14 of small dimensions, and a second roller 86d disposed for coaction with cassettes 14 of large dimensions. The reference roller 86a, the first rollers 86b, 86c, and the second roller 86d have the same diameter, and are integrally fixed to the shaft 84.

The reference roller 86a and the second roller 86d have a hardness greater than the first rollers 86b, 86c. Specifically, the reference roller 86a and the second roller 86d are required to have desired wear resistance and produce desired forces for feeding the cassette 14, and have a rubber hardness of 70°±15°. For example, the reference roller 86a and the second roller 86d are made of NBR (acrylonitrile butadiene rubber). The first rollers 86b, 86c are required to have desired wear resistance and elastic deformability (low hardness), and have a rubber hardness in the range of 25° to 35°. For example, the first rollers 86b, 86c are made of EPDM (ethylene-propylene terpolymer).

The reference roller 86a, the first rollers 86b, 86c, and the second roller 86d may be made of any of various materials insofar as they satisfy the above requirements, e.g., an elastomer.

The electromagnetic clutch 82 is mounted on one end of the lid closing roller 80 and has a driven gear 88 held in mesh with the drive gear 40 via a gear train.

The discharge mechanism 28 has an electrostatic charge removing mechanism 90 for removing electrostatic charges from the cassette 14 that is in contact with the lid closing roller 80. As shown in FIGS. 2 and 4, the electrostatic charge removing mechanism 90 comprises a charge removal brush 92 held in contact with the rubber rings 86 of the lid closing roller 80, and a leaf spring 94 serving as an electrically conductive grounding member held in contact with the shaft 84 of the lid closing roller 80.

The charge removal brush 92 extends in the direction indicated by the arrow F and has its longitudinal ends fastened to attachments 96 by setscrews 98. The charge removal brush 92 has bristles held in contact with the rubber rings 86 of the lid closing roller 80 at all times. The leaf spring 94 is positioned at the end of the lid closing roller 80 remote from the electromagnetic clutch 82. The leaf spring 94 held in contact with the shaft 84 of the lid closing roller 80 is fixed to the side plate 36b and electrically grounded via the side plate 36b.

As shown in FIG. 1, the erasing unit 20 and the reading unit 18 are positioned downstream of the feed mechanism 26 and connected thereto by a reciprocating feed system 102. The reciprocating feed system 102 comprises a plurality of roller pairs 104 that make up a vertical feed path extending from the cassette loading unit 16 and a horizontal feed path extending from the lower end of the vertical feed path. The erasing unit 20 is disposed on the vertical feed path. The reading unit 18 is disposed above the horizontal feed path. The erasing unit 20 comprises has a vertical array of erasing light sources 70 which extend horizontally. The erasing unit 20 may have a single erasing light source, and the erasing light source or sources may extend vertically.

The reading unit 18 comprises an auxiliary scanning feed system 108 for feeding the stimulable phosphor sheet S in a horizontal auxiliary scanning direction indicated by the arrow X, a laser beam applying unit 110 for applying a laser beam L as scanning light substantially vertically downwardly as indicated by the arrow Y to the stimulable phosphor sheet S which is being fed in the auxiliary scanning direction to scan the stimulable phosphor sheet S in a main scanning direction perpendicular to the auxiliary scanning direction, and an image reading unit 112 for collecting light emitted from the stimulable phosphor sheet S upon exposure to the laser beam L and photoelectrically reading the radiation image information carried on the stimulable phosphor sheet S based on the emitted light.

The laser beam applying unit 110 has an optical system 114 for bending the laser beam L which has been emitted horizontally in a substantially vertically downward direction to apply the laser beam L to the stimulable phosphor sheet S. The reading unit 18 also includes a light guide 116 and a reflecting mirror 118 that are positioned near the area where the laser beam L is applied to the stimulable phosphor sheet S. The light guide 116 serves to collect and guide the light that is emitted from the stimulable phosphor sheet S upon exposure to the laser beam L. The image reading unit 112 also has a photomultiplier 120 mounted on the light guide 116. The auxiliary scanning feed system 108 has first and second roller pairs 122, 124 positioned beneath the light guide 116 and the reflecting mirror 118 and spaced horizontally in the direction indicated by the arrow X from each other by a certain distance.

Operation of the image information reading apparatus 10 thus constructed will be described below.

The cassette 14 is horizontally loaded into the cassette loading region 16 that is positioned in an upper portion of the apparatus housing 12. The cassette 14 stores therein the stimulable phosphor sheet S with the radiation image information of a subject such as a human body being recorded thereon. The lid 24 of the loaded cassette 14 is opened by the lid opening/closing mechanism (not shown) in the cassette loading region 16.

Then, the actuator 34 is energized to move the suction cups 66a, 66b into the cassette 14. Specifically, as shown in FIGS. 2 and 3, the motor 38 is energized to cause the drive gear 40, the gear train 42, and the driven gear 44 to rotate the shaft 46 in a given direction. The swing arms 48 fixed to the opposite ends of the shaft 46 are turned to move the movable arm 56, which is connected to the swing arms 48 by the links 50, toward the cassette 14 while being guided by the guide grooves 52, 54 of the guide mechanism 32.

The suction cups 66a, 66b mounted on the movable arm 56 are guided by the guide mechanism 32 to move along the path inclined downwardly from above toward the surface to be attracted of the stimulable phosphor sheet S. The suction cups 66a, 66b then attract the stimulable phosphor sheet S, after which the motor 38 is energized to rotate in the reverse direction.

The movable arm 56 and the suction cups 66a, 66b, which have attracted the stimulable phosphor sheet S, are moved in unison from the cassette 14 toward the reciprocating feed system 102 while being guided by the guide mechanism 32, removing the stimulable phosphor sheet S from within the cassette 14. Substantially at the same time that the leading end of the stimulable phosphor sheet S removed from the cassette 14 is gripped by the first roller pair 104, the suction cups 66a, 66b release the stimulable phosphor sheet S.

The roller pairs 104 are rotated to feed the stimulable phosphor sheet S horizontally and then vertically downwardly along the vertical feed path of the reciprocating feed system 102. After the stimulable phosphor sheet S has passed through the erasing unit 20, the stimulable phosphor sheet S is fed along the horizontal feed path to the auxiliary scanning system 108 of the reading unit 18. While the stimulable phosphor sheet S is being removed from the cassette 14, the electromagnetic clutch 82 is disengaged to prevent the rotational power from being transmitted from the motor 38 to the lid closing roller 80.

As shown in FIG. 1, in the auxiliary scanning system 108, the stimulable phosphor sheet S is gripped by the first and second roller pairs 122, 124 and fed horizontally in the auxiliary scanning direction indicated by the arrow X. At the same time, the laser beam L is emitted from the laser beam applying unit 110. The laser beam L first travels horizontally and then is directed downwardly as indicated by the arrow Y by the optical system 114. The laser beam L is applied to the upper recording surface of the stimulable phosphor sheet S to scan the stimulable phosphor sheet S in the main scanning direction. In response to the application of the laser beam L, the upper recording surface of the stimulable phosphor sheet S emits light representing the recorded radiation image information. The emitted light is applied to the light guide 116 directly or by the reflecting mirror 118, and then guided by the light guide 116 to the photomultiplier 120, which photoelectrically reads the radiation image information based on the light.

After the radiation image information has been read from the stimulable phosphor sheet S, the auxiliary scanning feed system 108 is reversed to feed the stimulable phosphor sheet S upwardly along the reciprocating feed system 102 into the erasing unit 20. In the erasing unit 20, the erasing light sources 106 are energized to remove residual radiation image information from the stimulable phosphor sheet S. Thereafter, the stimulable phosphor sheet S is returned into the cassette 14, and the lid 24 is closed by the discharge mechanism 28. The cassette 14 is automatically delivered to a given position, and then manually unloaded from the cassette loading unit 16 by the operator. The stimulable phosphor sheet S in the cassette 14 is then processed to record next radiation image information.

In the present embodiment, for removing the cassette 14, the motor 38 of the discharge mechanism 28 is energized, and the electromagnetic clutch 82 is engaged to operatively connect the driven gear 88 to the lid closing roller 80. The energization of the motor 38 rotates the drive gear 40 in the direction indicated by the arrow G in FIG. 3, thus rotating the driven gear 88 in the direction indicated by the arrow H. The lid closing roller 80 rotates in unison with the drive gear 88 in the direction indicated by the arrow H, rotating the rubber rings 86 in rolling contact with the upper surface of the cassette 14.

Upon rotation of the lid closing roller 80, the cassette 14 is moved in the direction indicated by the arrow E1, and the lid closing roller 80 engages the lid 24 thereby to close the lid 24. After the cassette 14 is automatically fed to a given position in the direction indicated by the arrow E1, the electromagnetic clutch 82 is disengaged to disconnect the lid closing roller 80 from the driven gear 88. The operator then grips the cassette 14 and manually removes the cassette 14 from the cassette loading unit 16.

As described above, when the lid closing roller 80 is rotated, the cassette 14 is automatically moved from the cassette loading unit 16 to a given position. After the lid 24 is closed, the cassette 14 is manually removed by the operator. Therefore, even if the operator forcibly pulls the cassette 14 quickly, since the lid 24 is closed, the stimulable phosphor sheet S is reliably prevented from jumping partly or wholly out of the cassette 14.

The stimulable phosphor sheet S is thus prevented from being damaged by being caught between the casing 22 and the lid 24, or from entering the reciprocating feed system 102 and damaged or failing to be fed. Rather, the cassette 14 is efficiently and smoothly discharged from the cassette loading unit 16.

The hardness of the reference roller 86a and the second roller 86d is greater than the hardness of the first rollers 86b, 86c. Specifically, the reference roller 86a and the second roller 86d is made of NBR, for example, which has a rubber hardness of 70°±15°. Each of differently dimensioned cassettes 14 that are loaded and positioned with respect to the reference roller 86a as a reference position can automatically and reliably be removed from the cassette loading unit 16 upon rotation of the reference roller 86a. Even when such a cassette removal process is repeated, the reference roller 86a is effectively prevented from being quickly worn. The reference roller 86a thus has desired wear resistance and a feeding capability. Similarly, the second roller 86d has desired wear resistance and a feeding capability.

The first rollers 86b, 86c are made of EPDM, for example, which has a rubber hardness in the range of 25° to 35°. Even if the lid 24 of the cassette 14 is curved as shown in FIG. 5, the first rollers 86b, 86c can easily be elastically deformed along the shape of the lid 24. Not only the first rollers 86b, 86c are held in contact with the lid 24 to cause pressure localization, but all the reference roller 86a, the first rollers 86b, 86c, and the second roller 86d are reliably held in rolling contact with the lid 24 for smoothly removing the cassette 14 smoothly and efficiently. Thus, the first rollers 86b, 86c have desired wear resistance and elastic deformability (low hardness).

Since the reference roller 86a, the first rollers 86b, 86c, and the second roller 86d have the same diameter, they do not develop peripheral speed differences. Therefore, the reference roller 86a, the first rollers 86b, 86c, and the second roller 86d can be integrally fixed to the shaft 84. The reference roller 86a, for example, does not need to be larger in diameter and constructed as a free roller rotatable with respect to the shaft 84. The lid closing roller 80 is made up of a relatively small number of parts, and hence is economical. The lid closing roller 80 thus constructed is effective to automatically discharge the cassette 14 with ease.

In the present embodiment, the lid closing roller 80 is combined with the charge removal brush 92 and the leaf spring 94 which make up the electrostatic charge removing mechanism 90. The charge removal brush 92 is held in sliding contact with the rubber rings 86 of the lid closing roller 80. Even when the cassette 14 is electrostatically charged when the cassette 14 is loaded into and unloaded from the cassette loading unit 16, the electrostatic charges can reliably be removed from the cassette 14 through the charge removal brush 92 contacting the rubber rings 86 which are held in contact with the cassette 14.

The leaf spring 94 that is electrically grounded is held in sliding contact with the end of the shaft 84 at all times. Electrostatic charges are also reliably removed from the rubber rings 86 which are held in contact with the cassette 14 through the shaft 84 and the leaf spring 94, which are made of an electrically conductive material. Since the electrostatic charge removing mechanism 90 is constructed of the charge removal brush 92 and the leaf spring 94 only, the electrostatic charge removing mechanism 90 is relatively simple in structure.

In the present embodiment, the electromagnetic clutch 82 is mounted on the end of the lid closing roller 80. When the cassette 14 is manually removed by the operator, the electromagnetic clutch 82 is disengaged to disconnect the lid closing roller 80 from the motor 38. Consequently, when the cassette 14 is loaded and unloaded, an excessive load is not imposed on the operator from the motor 38, allowing the operator to load and unload the cassette 14 smoothly and easily.

The motor 38 for rotating the lid closing roller 80 is a component of the actuator 34 of the feed mechanism 26. Accordingly, no dedicated motor is required to rotate the lid closing roller 80. The discharge mechanism 28 is thus relatively simple in structure and is economical.

While the electrostatic charge removing mechanism 90 is constructed of the charge removal brush 92 and the leaf spring 94 in the illustrated embodiment, the electrostatic charge removing mechanism 90 may be constructed of either the charge removal brush 92 or the leaf spring 94. The stimulable phosphor sheet S has been described as a sheet-like member in the illustrated embodiment. However, the present invention is not limited to the stimulable phosphor sheet S, but any of various sheet-like recording mediums including photographic films may be used instead of the stimulable phosphor sheet S.

In the discharge mechanism for discharging a sheet-like member container according to the present invention, the lid closing roller is rotated by the rotary actuator to move the container automatically from the container loading unit to a given position, while the lid of the container is being closed. Then, the operator manually pulls the container from the container loading unit. The sheet-like member is reliably prevented from jumping out of the container without being affected by the manual action to remove the container from the container loading unit.

When the container is pulled out, the sheet-like member is prevented from jumping out of the container, and also prevented from being damaged with a simple arrangement. The container can be discharged efficiently and reliably from the container loading unit.

Although a certain preferred embodiment of the present invention has been shown and described in detail, it should be understood that various changes and modifications may be made therein without departing from the scope of the appended claims.

What is claimed is:

1. A mechanism for discharging a container having a lid for opening and closing an opening through which a sheet-like member is inserted, from a containing loading unit of a sheet-like member processing apparatus, comprising:

a lid closing roller for engaging the lid to close the lid and automatically delivering said container to a predetermined position upon rotation thereof;

a rotary actuator for rotating said lid closing roller; and clutch means for transmitting rotational power from said rotary actuator to said lid closing roller and disconnecting said lid closing roller from said rotary actuator;

whereby when said lid closing roller is rotated by said rotary actuator, said lid closing roller automatically delivers said container from said container loading unit to said predetermined position, and closes said lid.

2. A mechanism according to claim 1, wherein said lid closing roller has a plurality of rollers axially spaced at predetermined intervals, said rollers having different hardnesses.

3. A mechanism according to claim 2, wherein said lid closing roller has a shaft made of an electrically conductive material, said rollers comprising a plurality of rubber rings mounted on said shaft.

4. A mechanism according to claim 2, wherein said rollers have the same diameter, and include:

a reference roller disposed along a reference position with which each end of differently dimensioned containers is aligned;

first rollers disposed for coaction with cassettes of small dimensions; and a second roller disposed for coaction with containers of large dimensions;

said reference roller and said second roller having a hardness greater than said first rollers.

5. A mechanism according to claim 1, wherein said clutch means comprises an electromagnetic clutch.

6. A mechanism according to claim 1, further comprising:

electrostatic charge removing means for removing electrostatic charges from said container that is in contact with said lid closing roller.

7. A mechanism according to claim 6, wherein said electrostatic charge removing means comprises:

a charge removal brush held in contact with rubber rings of said lid closing roller.

8. A mechanism according to claim 6, wherein said electrostatic charge removing means comprises:

an electrically conductive grounded member held in contact with said lid closing roller which is made of an electrically conductive material.

9. A mechanism according to claim 7, wherein said electrostatic charge removing means comprises:

an electrically conductive grounded member held in contact with an electrically conductive shaft of said lid closing roller.

10. A mechanism according to claim 1, further comprising:

a sheet-like member feed mechanism for removing said sheet-like member from said container and/or introducing said sheet-like member into said container, said sheet-like member feed mechanism having a motor:

said motor doubling as said rotary actuator.

* * * * *